US008606449B2

United States Patent
Yun

(10) Patent No.: US 8,606,449 B2
(45) Date of Patent: Dec. 10, 2013

(54) METHOD AND SYSTEM FOR PROTECTING BATTERY OF HYBRID VEHICLE

(75) Inventor: Seok Young Yun, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 365 days.

(21) Appl. No.: 13/187,017

(22) Filed: Jul. 20, 2011

(65) Prior Publication Data
US 2012/0109434 A1 May 3, 2012

(30) Foreign Application Priority Data

Oct. 27, 2010 (KR) .................. 10-2010-0105183

(51) Int. Cl.
*B60W 10/10* (2012.01)
(52) U.S. Cl.
USPC ........ 701/22; 701/55; 180/65.265; 180/65.29
(58) Field of Classification Search
USPC ............... 701/22, 36, 51, 55, 58; 322/28–29; 180/65.265, 65.28, 65.285, 65.29
See application file for complete search history.

(56) References Cited

U.S. PATENT DOCUMENTS

| 8,140,205 B2 * | 3/2012 | Hanyu et al. ............. 701/22 |
| 2005/0102082 A1 * | 5/2005 | Joe et al. ................. 701/54 |
| 2005/0103544 A1 * | 5/2005 | Takami et al. ........... 180/65.2 |

FOREIGN PATENT DOCUMENTS

| JP | 2000-224713 A | 8/2000 |
| JP | 2004132285 A | 4/2004 |
| JP | 2005304229 A | 10/2005 |
| JP | 2006-050751 A | 2/2006 |
| JP | 2009234559 A | 10/2009 |

* cited by examiner

*Primary Examiner* — Richard Camby
(74) *Attorney, Agent, or Firm* — Edwards Wildman Palmer LLP

(57) ABSTRACT

A method for protecting a battery of a hybrid vehicle according to an exemplary embodiment of the present invention for a hybrid vehicle which selectively drives a motor by electricity of the battery and selectively charges the battery by electricity generated by driving of the motor. More specifically, the present invention provides a method and system that determines whether the motor is running at a speed that is greater than or equal to a predetermined speed, determines whether the motor has malfunctioned; determines a target shift speed by applying overcharge protection shift map in response to a determination that the motor is operating a speed greater than or equal to the predetermined speed and the that the motor is malfunctioning. Upon making this determination, the present invention performs a shift to the target shift speed.

14 Claims, 2 Drawing Sheets

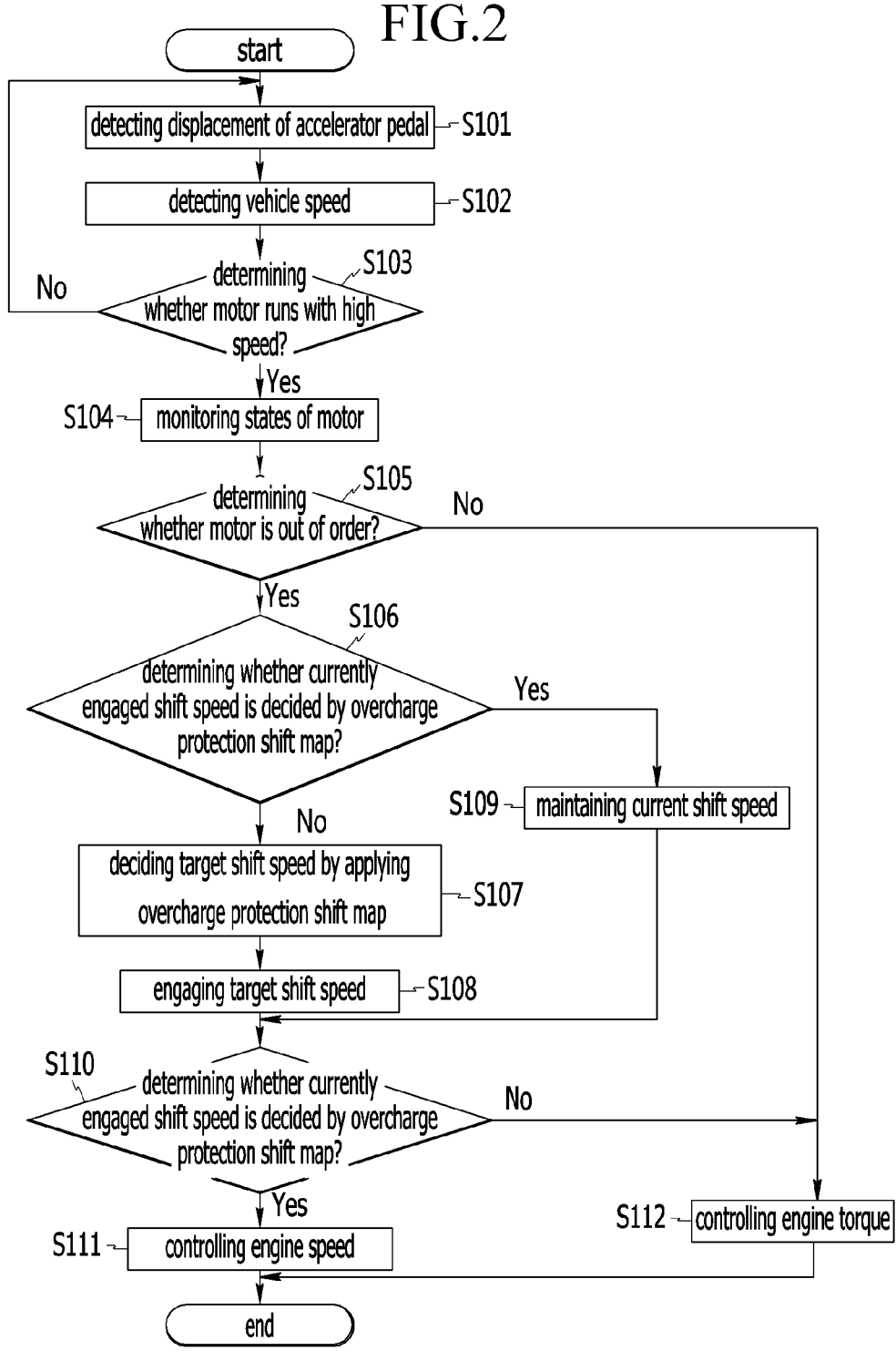

METHOD AND SYSTEM FOR PROTECTING BATTERY OF HYBRID VEHICLE

CROSS-REFERENCE TO RELATED APPLICATION

This application claims priority to and the benefit of Korean Patent Application No. 10-2010-0105183 filed in the Korean Intellectual Property Office on Oct. 27, 2010, the entire contents of which are incorporated herein by reference.

BACKGROUND OF THE INVENTION (a) Field of the Invention

The present invention relates to a hybrid vehicle. More particularly, the present invention relates to a method and a system for protecting a battery of a hybrid vehicle in order to prevent overcharge of high voltage battery during running of the hybrid vehicle.

(b) Description of the Related Art

Because of demands for enhancement of fuel efficiency and reinforcement of exhaust gas regulations, eco-friendly vehicles have been a focus of many research projects in the automotive industry. A hybrid vehicle is one type of such eco-friendly vehicles and has recently attracted a large amount of public attention.

A typical hybrid vehicle includes an engine, a transmission, a motor, an inverter system, and a high voltage battery. This engine, transmission, motor, inverter system, and high voltage battery are controlled by a controller so as to generate target power. Since the motor is driven by electricity from the high voltage battery in the hybrid vehicle, an interior permanent magnet motor which has characteristics of wide speed control region and wide torque control region is used so as to obtain high efficiency characteristics. If the interior permanent magnet motor fails while operating at a high rate of speed, high voltage occurs due to the permanent magnet rotating at a high speed.

In addition, the high voltage generated by malfunction of the motor is supplied to the high voltage battery due to the batter being an energy storing device of the hybrid vehicle through the inverter system as an excess charging voltage. Therefore, life of the high voltage battery may be shortened and/or the high voltage battery may be damaged in more serious cases should this occur. Even further, if the high voltage batter is not adequately protected from this voltage surge, the security of the driver cannot be effectively guaranteed, i.e., a fire could occur.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a method and a system for protecting a battery of a hybrid vehicle by suppressing the occurrence of excess high voltage when a motor has malfunctioned while operating at a high rate of speed and for protecting battery stably.

In one embodiment of the present invention, a method for protecting a battery of a hybrid vehicle according to an exemplary embodiment of the present invention is applied to the hybrid vehicle which selectively drives a motor by electricity of the battery and selectively charges the battery by electricity generated by driving of the motor. The method may include: determining whether the motor is running at a speed greater than or equal to a predetermined speed; determining whether the motor has failed or is malfunctioning; deciding a target shift speed by applying overcharge protection shift map in response to the motor running at a speed greater than or equal to the predetermined speed and the motor is out of order; and performing a shift to the target shift speed.

The target shift speed determined by applying the overcharge protection shift map may be lower than that decided by applying a general shift map at the same driving condition. The speed of the motor may be calculated from a displacement of an accelerator pedal and a vehicle speed.

Additionally, the method and system of the present invention may also determine whether an engine speed is greater than a predetermined maximum speed; and restrict, in response to the engine speed being greater than the predetermined maximum speed, the speed of the engine. Additionally, the engine torque may also be controlled in response to determining that the engine speed is less than or equal to the predetermined maximum speed.

A system for protecting a battery of a hybrid vehicle according to another exemplary embodiment of the present invention is applied to the hybrid vehicle. The hybrid vehicle has an engine and a motor as power sources. Power generated by the power sources is outputted to a transmission. The motor is selectively driven by electricity of the battery, while at the same time the battery is selectively charged by electricity generated by driving of the motor.

More specifically, one or more controllers are implemented to control the overall operations of the hybrid vehicle. One or more of these controllers may perform a shift to a shift speed determined based on either a general shift map or an overcharge protection shift map.

Additionally, one or more of these controllers may determine a target shift speed by applying the overcharge protection shift map and may perform a shift to the target shift speed when the motor operates at a speed greater than or equal to a predetermined speed and the motor has failed or has malfunctioned.

Furthermore, the target shift speed decided by applying the overcharge protection shift map may be less than that determined by applying a general shift map at the same driving condition. The controllers may also restrict the engine speed in response to the engine operating at a speed greater than the predetermined maximum speed. Likewise the controllers may also control the engine torque in response to the engine speed being less than or equal to the predetermined maximum speed.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2 is a flowchart of a method for protecting a battery of a hybrid vehicle according to an exemplary embodiment of the present invention.

DESCRIPTION OF SYMBOLS

Figure 1:
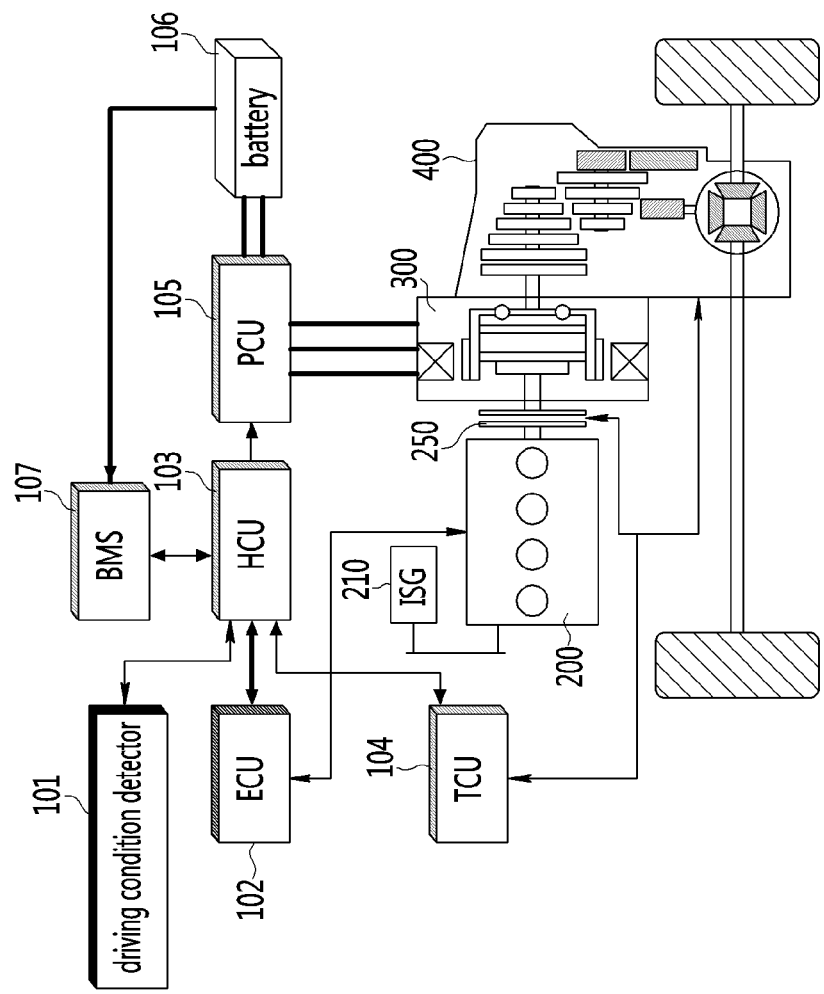
FIG. 1 is a schematic diagram of a system for protecting a battery of a hybrid vehicle according to an exemplary embodiment of the present invention.

101: driving condition detector
102: ECU

103: HCU
104: TCU
105: PCU 1
06: battery
107: BMS
200: engine
210: ISG
250: engine clutch
300: motor
400: transmission It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter, referring to the drawings, exemplary embodiments of the present invention will be described in detail.

As those skilled in the art would realize, the described embodiments may be modified in various different ways, all without departing from the spirit or scope of the present invention. Description of components that are not necessary for explaining the present invention will be omitted, and the same constituent elements are denoted by the same reference numerals in this specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

FIG. 1 is a schematic diagram of a system for protecting a battery of a hybrid vehicle according to an exemplary embodiment of the present invention.

Referring to FIG. 1, a system for protecting a battery of a hybrid vehicle according to an exemplary embodiment of the present invention. More specifically, the system in FIG. 1 includes, a driving condition detector 101, an engine control unit (ECU) 102, a hybrid control unit (HCU) 103, a transmission control unit (TCU) 104, a power control unit (PCU) 105, a battery 106, a battery management system (BMS) 107, an engine 200, an Idle Stop and Go controller (ISG) 210, an engine clutch 250, a motor 300, and a transmission 400.

The driving condition detector 101 detects information such as a displacement of an accelerator pedal, a displacement of a brake pedal, a vehicle speed, and an engine speed, and transmits the information corresponding thereto to the HCU 103. The driving condition detector 101 may include a brake pedal sensor (not shown) for detecting the displacement of the brake pedal and an accelerator pedal sensor (APS) (not shown) for detecting the displacement of the accelerator pedal. In addition, the driving condition detector 101 may further include a vehicle speed detector (not shown) for detecting a current vehicle speed and an engine speed detector (not shown) for detecting an engine speed.

The ECU 102, together with the HCU 103 connected thereto through a network, controls the overall operations of the engine 200. The ECU 102 prevents overcharge of the battery 106 by restricting the engine speed according to a command or request from the HCU 103 and inducing the motor 300 to rotate at a lower speed.

The HCU 103 is an uppermost controller and controls all of the sub-controllers connected thereto through a network so as to control the overall operations of the hybrid vehicle. When the motor 300 is out of order/fail/malfunctioning when operating at a high rate of speed, the HCU 103 restricts a shift speed by utilizing characteristics of the transmission, and controls the engine speed to in turn slow down the motor 300. Thus, occurrence of an excess voltage may be prevented and in turn the overcharge of the battery 106 may be prevented.

The TCU 104 controls actuators provided in the transmission 400 so as to control a shift to a target shift speed according to a request or command from the HCU 103 connected thereto through a network. The TCU 104 controls hydraulic pressure supplied to the engine clutch 250 to engage and release the engine clutch 250 and to control power delivery from the engine 200. The TCU 104 includes a general shift map and an overcharge protection shift map for the case that the motor is out of order in state of running with high speed.

If the motor 300 is malfunctioning when the vehicle is operating at a high rate of speed, the TCU 104 determines the target shift speed (e.g., first forward speed, second forward speed, third forward speed, fourth forward speed, fifth forward speed, sixth forward speed, reverse speed, and so on) by applying an overcharge protection shift map in response to a request to do so from the HCU 103. After that, the TCU 104 controls the actuators provided in the transmission 400 so as to control the shift to the determined target shift speed. Accordingly, it the motor 300 is prevented from being run at a high rate of speed when the motor is malfunctioning and the occurrence of the excess voltage may be prevented.

Notably, if the motor 300 is malfunctioning or has failed, the target shift speed determined by applying the overcharge protection shift map may be less than that determined by applying a general shift map.

The PCU 105 includes a motor control unit (MCU), an inverter provided with a plurality of electric switching elements, and a protecting circuit. The PCU 105 converts DC voltage supplied from the battery 106 into 3-phase AC voltage according to a control signal transmitted from the HCU 104. Thereby, the PCU 105 drives the motor 300. In addition, the PCU 105 charges the battery 106 by using voltage generated by the motor 300. An insulated gate bipolar transistor (IGBT), a metal-oxide-semiconductor field-effect transistor (MOSFET) switch, or a transistor can be used as the electric switching element provided in the PCU 105.

The battery 106 supplies electricity to the motor 300 and stores the voltage generated by the motor 300 during an HEV (engine+motor) mode and an EV (motor) mode. The BMS 107 detects information such as voltage, current and temperature of the battery 106 and manages a charging state of the battery 106. In addition, the BMS 107 controls charging current or discharging current of the battery 106 so as to prevent overdischarge to a voltage less than a minimum voltage or to prevent overcharge to a voltage greater than a maximum voltage.

In the illustrative embodiment of the present invention, the engine 200 is driven at an optimal driving point by control of the ECU 102. An Idle Stop and Go controller (ISG) 210 performs idle stop and go operations of the engine 200 according to the driving condition of the vehicle. The engine clutch 250 is disposed between the engine 200 and the motor 300 and is operated by control of the TCU 104. The engine clutch 250 controls the power delivery between the engine 200 and the motor 300.

Further, the motor 300 is driven by 3-phase AC voltage supplied through the PCU 105 so as to assist the power of the engine 200, and charges the battery 106 when the power of the engine 200 is in excess or the brakes are operated. Also, a gear ratio of the transmission 400 is controlled by the TCU 104. The output torque transmitted through the clutch 250 is adjusted by the gear ratio during each driving mode and is transmitted to the axle and subsequently the wheels of the vehicle, thereby allowing the wheels to rotate. The transmission 400 may be embodied as either an automatic transmission or a continuously variable transmission (CVT)

General operations of the hybrid vehicle to which an exemplary embodiment of the present invention is applied are the same as or are similar to those of a conventional hybrid vehicle. Therefore, detailed description thereof will be omitted.

FIG. 2 is a flowchart of a method for protecting a battery of a hybrid vehicle according to an exemplary embodiment of the present invention.

Illustratively, in the exemplary embodiment of the present invention during operation of the hybrid vehicle, the HCU 103 (the uppermost controller) detects displacement of an accelerator pedal by means of the driving condition detector 101 at a step S101 while at the same time the vehicle speed detector detects a current vehicle speed at step S102.

At this time, the HCU 103 analyzes the displacement of the accelerator pedal and the current vehicle speed and determines whether the motor 300 running at a speed that is greater than a predetermined speed at step S103. If the motor 300 is running at a speed that is less than or equal to the predetermined speed at step S103, excess voltage will not be generated even if the motor 300 malfunctions or fails. Thus, the method according to the exemplary embodiment of the present invention returns to step S101.

If the motor 300, however, is running/operating at a speed greater than the predetermined speed at step S103, states of the motor 300 is monitored at step S104 to determine whether the motor 300 is malfunctioning at step S105. If the motor 300 is not malfunctioning in step S105, the HCU 103 controls the engine 200 through the ECU 102 so as to maintain output torque stably at step S112.

If the motor 300, however, is malfunctioning at step S105, information about the shift speed transmitted from the TCU 104 is analyzed and whether a currently engaged shift speed is determined by the overcharge protection shift map at step S106. If the currently engaged shift speed is determined by the general shift map at step S106, the HCU 103 informs the TCU 104 of the motor's malfunction.

In this case, the TCU 104 decides the target shift speed by applying the overcharge protection shift map at step S107 and controls the transmission 400 to be engaged at the target shift speed at step S108. The target shift speed determined by applying the overcharge protection shift map may be less than that having been determined by applying the general shift map, and thereby the vehicle speed may be reduced and the speed of the motor 300 may be reduced. If the current shift speed, however, is determined by applying the overcharge protection shift map at step S106, it is determined that control for preventing overcharge of the battery according to the malfunction of the motor 300 should be performed and the current shift speed is maintained at step S109.

After that, the engine speed is detected, and it is determined whether the engine speed is greater than the predetermined maximum speed at step S110. If the engine speed is less than or equal to the predetermined maximum speed at the step S110, the engine torque is controlled through the ECU 102 at step S112. If the engine speed is greater than the predetermined maximum speed at step S110, the engine speed may be restricted through the ECU 102 at step S111.

Thus, if the motor 300 is malfunctioning while operating at a high rate of speed, the transmission 400 is controlled to be engaged to a lower shift speed by applying the overcharge protection shift map and engine torque is restricted. Therefore, rotation of the motor 300 at a high rate of speed may be prevented and occurrence of excess voltage at the motor 300 may be prevented.

In addition, overcharge of the battery 106 may be prevented so as to extend life of the battery 106, and provide a certain level of safety to a driver (i.e., the overall safety of the vehicle is improved).

Furthermore, the control mechanisms of the present invention may be embodied as computer readable media on a non-transitory computer readable medium containing executable program instructions executed by a processor. Examples of the computer readable mediums include, but are not limited to, ROM, RAM, compact disc (CD)-ROMs, magnetic tapes, floppy disks, and optical data storage devices. The computer readable recording medium can also be distributed in network coupled computer systems so that the computer readable media is stored and executed in a distributed fashion.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for protecting a battery of a hybrid vehicle which selectively drives a motor by electricity of the battery and selectively charges the battery by electricity generated by driving of the motor, the method comprising:
   determining, by one or more controllers, whether a motor is running at a speed greater than or equal to a predetermined speed;
   determining, by the one or more controllers, whether the motor in the hybrid vehicle has malfunctioned;
   in response to a motor running at a speed greater than or equal to the predetermined speed and in response to determining the motor is malfunctioning, determining, by the one or more controllers, a target shift speed by applying overcharge protection shift map; and
   performing, by the one or more controllers, a shift to the target shift speed.

2. The method of claim 1, wherein the target shift speed determined by applying the overcharge protection shift map is less than that determined by applying a general shift map during a same type of driving conditions.

3. The method of claim 1, wherein the speed of the motor is calculated from a displacement of an accelerator pedal and a vehicle speed.

4. The method of claim 1, further comprising:
   determining whether an engine speed is greater than a predetermined maximum speed; and
   in response to the engine speed being greater than the predetermined maximum speed, restricting the engine speed by the one or more controllers.

5. The method of claim 4, further comprising controlling an engine torque in response to the engine speed being less than or equal to the predetermined maximum speed.

6. A system for protecting a battery of a hybrid vehicle comprising:
   an engine and a motor operating a power sources, wherein the engine and motor outputs power to a transmission, selectively drive a motor by electricity of the battery, and selectively charge the battery by electricity generated by driving of the motor;
   one or more controllers configured to control the overall operations of the hybrid vehicle, perform a shift to a shift speed decided according to one of a group consisting of a general shift map and an overcharge protection shift map, and determine a target shift speed by applying the overcharge protection shift map and perform a shift to the target shift speed when the motor operates at a speed greater than or equal to a predetermined speed and the motor has been determined to have malfunctioned.

7. The system of claim 6, wherein the target shift speed determined by applying the overcharge protection shift map is less than that determined by applying a general shift map during a same type of driving conditions.

8. The system of claim 6, wherein one or more third controllers are configured to restrict an engine speed in response to the engine speed being greater than the predetermined maximum speed.

9. The system of claim 8, wherein one of the one or more o controllers are further configured to control an engine torque in response to the engine speed being less than or equal to the predetermined maximum speed.

10. A non-transitory computer readable medium containing executable program instructions executed by a processor to control an engine speed and torque of a hybrid vehicle, comprising:
   program instructions that determine whether a motor is running at a speed greater than or equal to a predetermined speed;
   program instructions that determine whether the motor in the hybrid vehicle has malfunctioned;
   program instructions that determine a target shift speed by applying overcharge protection shift map in response to a motor running at a speed greater than or equal to the predetermined speed and in response to determining the motor is malfunctioning; and
   program instructions that perform a shift to the target shift speed.

11. The non-transitory computer readable medium of claim 10, wherein the target shift speed determined by applying the overcharge protection shift map is less than that determined by applying a general shift map during a same type of driving conditions.

12. The non-transitory computer readable medium of claim 10, wherein the speed of the motor is calculated from a displacement of an accelerator pedal and a vehicle speed.

13. The non-transitory computer readable medium of claim 10, further comprising:
   program instructions that determine whether an engine speed is greater than a predetermined maximum speed; and
   program instructions that restrict the engine speed in response to the engine speed being greater than the predetermined maximum speed.

14. The non-transitory computer readable medium of claim 13, further comprising program instructions that control an engine's torque in response to the detected engine speed being less than or equal to the predetermined maximum speed.

* * * * *